(12) United States Patent
Miyata et al.

(10) Patent No.: US 8,720,415 B2
(45) Date of Patent: May 13, 2014

(54) OUTPUT CONTROL DEVICE OF VEHICLE

(75) Inventors: Toshiyuki Miyata, Okazaki (JP);
Katsunori Ueda, Okazaki (JP); Hitoshi Toda, Okazaki (JP); Koji Shibata, Okazaki (JP); Koji Maema, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 567 days.

(21) Appl. No.: 13/153,839

(22) Filed: Jun. 6, 2011

(65) Prior Publication Data

US 2011/0297124 A1 Dec. 8, 2011

(30) Foreign Application Priority Data

Jun. 7, 2010 (JP) ................. P2010-130057
May 26, 2011 (JP) ................. P2011-117580

(51) Int. Cl.
*F02D 7/00* (2006.01)

(52) U.S. Cl.
USPC .......................... 123/391; 701/102

(58) Field of Classification Search
CPC ............... F02D 2200/0406; F02D 2200/1004; F02D 2200/602; F02D 41/02; F02D 41/18; F02D 2250/18
USPC ................... 123/378, 391, 399, 436; 701/110
See application file for complete search history.

(56) References Cited

U.S. PATENT DOCUMENTS

| | | | | |
|---|---|---|---|---|
| 6,024,069 A * | 2/2000 | Yoshino | ......................... | 123/295 |
| 6,237,563 B1 * | 5/2001 | Froehlich et al. | ............. | 123/350 |
| 6,260,539 B1 * | 7/2001 | Minowa et al. | ............... | 123/478 |
| 6,401,694 B2 * | 6/2002 | Minowa et al. | ............... | 123/478 |
| 6,543,422 B2 * | 4/2003 | Minowa et al. | ............... | 123/478 |
| 7,107,978 B2 * | 9/2006 | Itoyama | ........................ | 123/683 |
| 7,747,378 B2 * | 6/2010 | Shiraishi et al. | ............. | 701/103 |
| 8,181,627 B2 * | 5/2012 | Sharples et al. | .............. | 123/319 |
| 8,332,122 B2 * | 12/2012 | Tanaka et al. | .................. | 701/101 |
| 8,335,634 B2 * | 12/2012 | Kang et al. | ..................... | 701/110 |
| 8,340,888 B2 * | 12/2012 | Kociba et al. | ................. | 701/110 |
| 2005/0114011 A1 | 5/2005 | Itoyama | | |

FOREIGN PATENT DOCUMENTS

JP 4120524 B2 7/2008

* cited by examiner

*Primary Examiner* — Thomas Moulis
*Assistant Examiner* — Elizabeth Hadley
(74) *Attorney, Agent, or Firm* — Birch, Stewart, Kolasch & Birch, LLP (57) ABSTRACT

An output control device of a vehicle is provided. A flow speed ratio calculator obtains a flow speed ratio which is a ratio between a flow speed of an intake air of the internal combustion engine realizing a current base request torque which is currently calculated and a flow speed of the intake air of the internal combustion engine realizing a previous request torque which is previously calculated. A base request torque corrector corrects the base request torque based on the flow speed ratio. A controller controls a driving parameter of the internal combustion engine according to the current request torque which is currently calculated based on the current base request torque corrected by the base request torque corrector.

6 Claims, 4 Drawing Sheets

OUTPUT CONTROL DEVICE OF VEHICLE

BACKGROUND

The present invention is related to an output control device of a vehicle, and more particularly, is related to a technique of improving the optimization of output torque with respect to a request torque in an internal combustion engine.

For example, in a vehicle in which an internal combustion engine is mounted, when a driver operates an accelerator in a step-like manner, in a so-called critical region in which a pressure ratio (intake air pressure/atmospheric pressure) between an intake air pressure (for example, intake manifold pressure) and the atmospheric pressure is equal to or less than a predetermined value (for example, 0.5283) and a flow speed of the intake air becomes the sonic speed, it is known that an amount of the intake air entering into a cylinder exhibits a behavior of a first-order delay. Accordingly, in an intake system capable of independently controlling a throttle valve with respect to the accelerator operation, generally, the amount of intake air entering into the cylinder is assumed by performing the first-order delay calculation to a value corresponding to the accelerator operation. And, for example, an index of a target torque is obtained based on the assumed value of the intake air amount. Then, the throttle valve is adjusted to a proper opening degree based on the index so that a desired output torque is obtained. For example, DRIVE-BY-WIRE (DBW) system is used as the above intake system.

Meanwhile, in a condition where the opening degree of the throttle valve is in the vicinity of a full opening state and becomes a so-called non-critical region in which the pressure ratio exceeds the predetermined value, when the driver operates the accelerator in the step-like manner, it is also known that the intake air amount does not always exhibit the behavior of the first-order delay. In the non-critical region in which the pressure ratio exceeds the predetermined value, the above described first-order delay calculation is not performed, or a calculation processing different to the first-order delay calculation of the critical region is performed. For example, as an example of the calculation processing in which a fresh air amount can be accurately predicted by using a specific equation is known (refer to Patent document 1).

[Patent Document 1] Japanese Patent No. 4120524

SUMMARY

If the first-order delay calculation is not performed in the non-critical region where the pressure ratio exceeds the predetermined value as described above, the amount of the intake air which enters into the cylinder can hardly be calculated correctly during driving of the vehicle. Further, if different processings are performed in the critical region and in the non-critical region respectively, the two processings should be used separately according to the pressure ratio. Specifically, since the flow speed of the intake air varies greatly according to the pressure ratio in the non-critical region, it is difficult to express using a simple calculation equation, and even though the intake air amount is assumed through the other calculation processing as described above, the calculation processing becomes complicated.

Thus, for example, in the non-critical region, it is considered that the opening degree of the throttle valve or the intake air amount entering into the cylinder may be matched according to the accelerator operation by using a calibration, based on an experiment or the like. In so doing, it is troublesome to perform the calibration, and the matched data is constituted as a map or the like and should be entirely stored in a memory. Thus, the memory capacity is increased or a calculation processing speed is decreased, and this is not favorable.

From the above described standpoint, there is a need for the opening degree of the throttle valve and further the amount of the intake air entering into the cylinder to be able to be adjusted by performing a simulation of simple configuration with respect to the behavior of the amount variation of the intake air and the behavior of the amount of the intake air entering into the cylinder which are different according to a measurement of the accelerator manipulation (opening degree of the accelerator) or a manipulating speed of the accelerator (opening speed of the accelerator).

It is therefore an object of the invention to provide an output control device of a vehicle which has a simple constitution and can accurately assume a target intake air flow rate in keeping with the actual regardless of the accelerator operation state, so that the output torque of the internal combustion engine is properly controlled.

According to an advantageous aspect of the invention, there is provided an output control device of a vehicle in which an internal combustion engine is mounted, the output control device comprising:

an accelerator manipulation degree detector that detects an operation degree of an accelerator installed in the vehicle;

a base request torque calculator that calculates a base request torque based on the operation degree of the accelerator;

a request torque calculator that calculates a request torque based on the base request torque;

a flow speed ratio calculator that obtains a flow speed ratio which is a ratio between a flow speed of an intake air of the internal combustion engine realizing a current base request torque which is currently calculated by the base request torque calculator and a flow speed of the intake air of the internal combustion engine realizing a previous request torque which is previously calculated by the request torque calculator;

a base request torque corrector that corrects the base request torque based on the flow speed ratio; and a controller that controls a driving parameter of the internal combustion engine according to the current request torque which is currently calculated by the request torque calculator based on the current base request torque corrected by the base request torque corrector.

The output control device may further comprise a maximum torque setting unit that sets a maximum torque which is the maximum value of the output torque of the internal combustion engine which is realizable as the request torque, and may be configured such that the flow speed ratio calculator calculates the flow speed of the intake air of the internal combustion engine realizing the current base request torque based on a ratio between the current base request torque and the maximum torque which is set by the maximum torque setting unit, and the flow speed ratio calculator calculates the flow speed of the intake air of the internal combustion engine realizing the previous request torque based on a ratio between the previous request torque and the maximum torque which is set by the maximum torque setting unit.

The output control device may be configured such that the request torque includes an indicated mean effective pressure corresponding to the request torque as an index of the request torque, the base request torque includes an indicated mean effective pressure corresponding to the base request torque as an index of the base request torque, and the maximum torque includes an indicated mean effective pressure corresponding to the maximum torque as an index of the maximum torque.

The output control device may be configured such that the request torque includes a filling efficiency corresponding to the request torque as an index of the request torque, the base request torque includes a filling efficiency corresponding to the base request torque as an index of the base request torque, and the maximum torque includes a filling efficiency corresponding to the maximum torque as an index of the maximum torque.

The output control device may be configured such that the request torque includes a volumetric efficiency corresponding to the request torque as an index of the request torque, the base request torque includes a volumetric efficiency corresponding to the base request torque as an index of the base request torque, and the maximum torque includes a volumetric efficiency corresponding to the maximum torque as an index of the maximum torque.

The request torque calculator may set the request torque to be restricted to the base request torque when the request torque calculated by the request torque calculator is larger than the base request torque.

DETAILED DESCRIPTION OF EXEMPLIFIED EMBODIMENTS

Hereinafter, an embodiment of the invention will be described with reference to drawings.

[First Embodiment]

In an output control device of a vehicle according to the embodiment of the invention, the output control device in which a gasoline engine is mounted as an engine (an internal combustion engine) for example, and an intake air system called DRIVE-BY-WIRE (DBW) is equipped as the output control device for example.

The intake air system called DBW is constituted so as to independently control an opening degree of an electronic control throttle valve by an electronic control unit according to operation information of an accelerator pedal, or the like.

Figure 1:
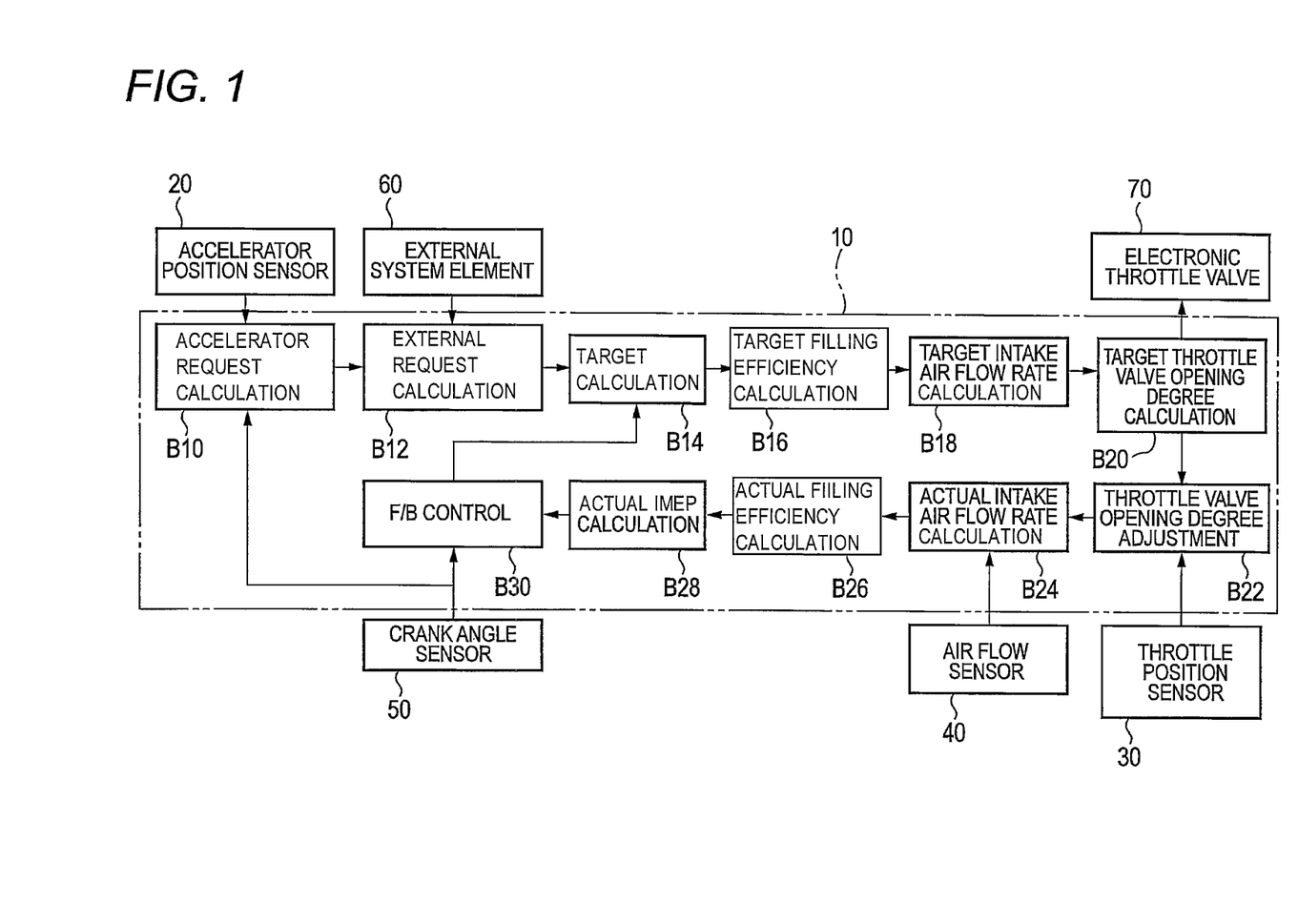
FIG. 1 is a control block diagram showing an entire configuration of an output control device of a vehicle according to the invention.

FIG. 1 is a block diagram showing an entire configuration of the output control device of the vehicle according to the invention which is periodically performed in an electronic control unit (ECU) 10.

As shown in FIG. 1, a sensor such as an accelerator position sensor (accelerator operation degree detector) 20 which detects an accelerator operation degree of an acceleration pedal by a driver of the vehicle, a throttle position sensor 30 which detects the opening degree of an electronic control throttle valve 70, an air flow sensor 40 which detects an intake air flow rate, and a crank angle sensor 50 which detects the crank angle of the engine and further the engine rotation speed Ne, are electrically connected to the input side of ECU 10. Further, signal lines of various outside system elements 60 for the engine such as a Continuously Variable Transmission (CVT) or a vehicle stability control system, for example, and an intake air pressure sensor (an intake air pressure detector, not shown) which detects an intake air pressure (for example, an intake manifold pressure) are electrically connected to the input side of ECU 10. Further, the electronic control throttle valve 70 is electrically connected to an output side of the ECU 10.

In addition, as shown in FIG. 1, the ECU 10 includes an accelerator request calculation block B10, an outside request calculation block B12, a target calculation block B14, a target filling efficiency calculation block B16, a target intake air flow rate calculation block B18, a target throttle valve opening degree calculation block B20, a throttle valve opening degree adjustment block B22, an actual intake air flow rate calculation block B24, an actual filling efficiency calculation block B26, an actual IMEP calculation block B28, and a F/B control block B30. The accelerator request calculation block B10 calculates an indicated mean effective pressure (IMEP) Pi used as an index of a request torque, as a request Pia (request torque) based on a signal from the accelerator position sensor 20 or the engine rotation speed Ne detected by the crank angle sensor 50. The outside request calculation block B12 calculates outside request Pio which is the IMEP Pi based on an outside load request from an outside system element 60. The target calculation block B14 calculates a target Pit which is a target value of the IMEP Pi used as an index of the target torque, based on the accelerator request Pi and the outside request Pio. The target filling efficiency calculation block B16 calculates a target filling efficiency Ect which is a target value of a filling efficiency Ec, based on the target Pit. The target intake air flow rate calculation block B18 calculates a target intake air flow rate Qt which is a target value of the intake air flow rate passing through the electronic control throttle valve 70, based on the target filling efficiency Ect. The target throttle valve opening degree calculation block B20 calculates a target throttle valve opening degree which is a target value of the opening degree of the electronic control throttle valve 70, based on the target intake air flow rate Qt, and provides an output signal to the electronic control throttle valve 70. The throttle valve opening degree adjustment block B22 adjusts the opening degree of the electronic control throttle valve 70 based on an opening degree information of the electronic control throttle valve 70 from the throttle position sensor 30. The actual intake air flow rate calculation block B24 calculates an actual intake air flow rate Qr at the opening degree of the adjusted electronic control throttle valve 70 based on information from the air flow sensor 40. The actual filling efficiency calculation block B26 calculates an actual filling efficiency Ecr based on the actual intake air flow rate Qr. The actual IMEP calculation block B28 calculates an actual IMEP Pir based on the actual filling efficiency Ecr. The F/B control block B30 performs a feedback control of the electronic control throttle valve 70 along with performing an engine rotation speed feedback control so that the engine rotation speed Ne detected by the crank angle sensor 50 based on the actual IMEP Pir becomes a target idle rotation speed when the engine is in an idle driving state. Therefore, a control program is constituted to control a driving parameter of the engine according to the control block diagram (controller).

That is, in the output control device of the invention, ECU 10 performs the control periodically by the control block diagram of FIG. 1, so as to perform a so-called torque base control based on the output torque of the engine. Further, ECU 10 obtains the index of the target torque from the index of the request torque, adjusts the electronic control throttle valve 70 to a proper opening degree based on the index of the target torque, and obtains a desired output torque in the engine. Therefore, the electronic control throttle valve 70 is correctly controlled based on the index of the target torque, and it is possible to reliably obtain the desired output torque in the engine.

In the accelerator request calculation block B10, the request Pia is calculated based on the accelerator request signal from the accelerator position sensor 20 as above. Specifically, as described above, since the actual intake air amount exhibits behavior of first-order delay, the first-order delay calculation is performed to the request Pia relating to the intake air amount.

Figure 2:
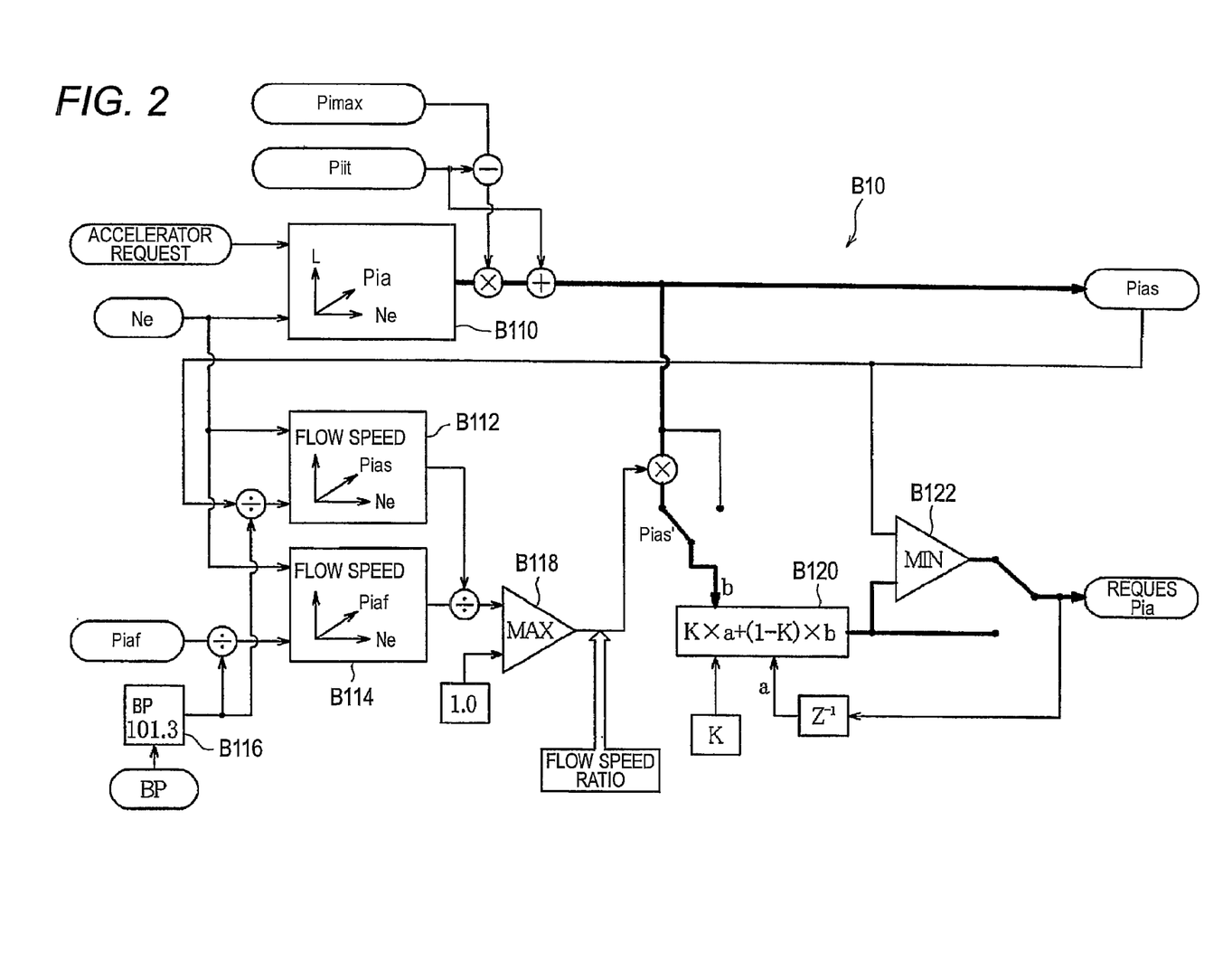
FIG. 2 is a control block diagram showing a calculation procedure of a request Pia of an output control device according to a first embodiment of the invention.

FIG. 2 is a control block diagram showing a calculation procedure of the request Pia in the accelerator request calculation block B10 of the output control device of the invention. Hereinafter, the calculation procedure of the request Pia of the invention will be described with reference to FIG. 2.

The accelerator request signal from the accelerator position sensor 20 and the engine rotation speed Ne detected by the crank angle sensor 50 are provided to a request load rate calculation block B110, and a request load rate L is calculated in the request load rate calculation block B110. Based on the accelerator request signal and the engine rotation speed Ne, the request load rate L is interpolated in consideration of the load at a state where the engine is in an idle driving state of 0% and the load at a state where the engine can provide the maximum torque is 100%. The request load rate L is preset by a request load rate map having the accelerator request signal and the engine rotation speed Ne as parameters. Further, a base request Pias (a base request torque) which is an instantaneous value of the request Pia is obtained from the following equation 1 based on the calculated request load rate (a base request torque calculator).

$$Pias = (Pimax - Piit) \times L + Piit \quad (1)$$

Here, the Pimax is the maximum value of the engine output torque which is realizable as the request torque, and the Pimax is the maximum value of the preset IMEP Pi (the maximum torque setting unit). The Piit is a target value of the preset IMEP Pi at the idle driving state.

The engine rotation speed Ne and the base request Pias which is obtained as described above are provided to a current request flow speed calculation block B112. Further, the flow speed of the intake air corresponding to the base request Pias in the current request flow speed calculation block B112, that is, the current request flow speed is calculated. The current request flow speed is preset by a request flow speed map having the base request Pias and the engine rotation speed Ne as parameters.

Further, when the base request Pias is provided to the current request flow speed calculation block B112, the base request Pias is corrected by an atmospheric pressure in an atmospheric pressure correction block B116. Since the request flow speed map is set at a standard atmospheric pressure, the base request Pias is divided by a value (BP/101.3) which is obtained by dividing the atmospheric pressure BP (kPa) (an environment parameter) by the standard atmospheric pressure (101.3 kPa). The atmospheric pressure BP is variable according to altitude. Therefore, the base request Pias is corrected to be suitable to the request flow speed map.

The engine rotation speed Ne is provided to the last request flow speed calculation block B114 along with a previous request Piaf which is the request Pia calculated in the previous calculation period and stored in ECU 10. Further, the flow speed of the intake air corresponding to the previous request Piaf in the previous request flow speed calculation block B114, that is, the previous request flow speed is calculated. Similarly to the current request flow speed, the previous request flow speed is preset by the request flow speed map having the previous request Piaf and the engine rotation speed Ne as parameters.

Also in the this case, similarly to the base request Pias, since the request flow speed map is set by the standard atmospheric pressure, the previous request Piaf is corrected by the atmospheric pressure so as to be suitable to the request flow speed map.

Therefore, when the current request flow speed and the last request flow speed are calculated, the ratio of the current request flow speed and the previous request flow speed (the previous request flow speed/the current request flow speed), that is, the flow speed ratio is obtained by dividing the previous request flow speed by the current request flow speed (a flow speed ratio calculator).

Further, the flow speed ratio is determined whether or not greater than 1.0 in a comparison block B118. If the flow speed ratio is greater than 1.0, the flow speed ratio obtained by the flow speed ratio calculator is adopted and multiplied to the base request Pias. Meanwhile, if the flow speed ratio does not exceed 1.0 value, 1.0 is multiplied to the base request Pias (a base request torque corrector).

In this way, the flow speed is obtained by dividing the previous request flow speed by the current request flow speed ratio, and if the flow speed is multiplied to the base request Pias when the flow speed ratio is greater than 1.0, the base request Pias is corrected to a greater value according to the flow speed ratio, and the base request Pias is optimized.

Figure 3:
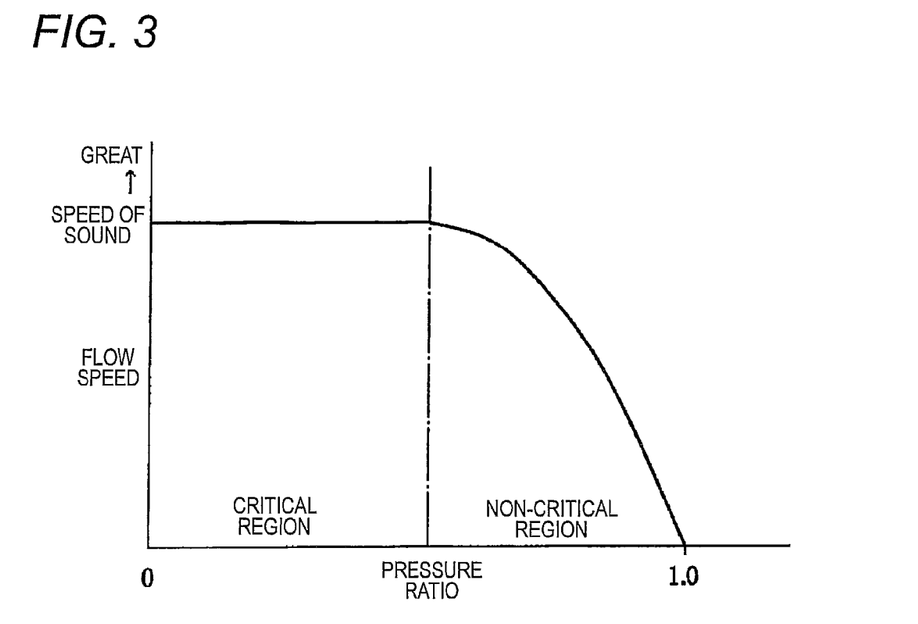
FIG. 3 is a diagram showing a relation between a pressure ratio and a flow speed.

In a non-critical region such that the pressure ratio (the intake air pressure/the atmospheric pressure) exceeds the predetermined value (for example, 0.5283) because the opening degree of the electronic control throttle valve 70 is in a vicinity of a full opening state, the flow speed of the intake air is, normally, slowed as the opening degree of the electronic control throttle valve 70 increases, as shown in the relation of the pressure ratio and the flow speed of FIG. 3. However, when the driver greatly operates the accelerator pedal by the step-like manner from the critical region to the non-critical region, in the early time of the variation in which the flow speed of the intake air is varied from the high side to the low side, since the intake air is not input and the intake air pressure also is not varied, the opening degree of the electronic control throttle valve 70 becomes large in a state where the flow speed of the intake air is high. Therefore, an inertial force of the intake air also has an influence, and actually, the intake flow rate of the intake air passing through the electronic control throttle vale 70 overshoots. Accordingly, the base request Pias can be optimized to a value which is based on the overshoot flow rate of the intake air passing through the electronic control throttle valve 70.

Meanwhile, in the critical region such that the pressure ratio is less than the predetermined value, the flow speed of the intake air maintains the sonic speed without variation as shown in FIG. 3. The intake air passing through the electronic throttle valve 70 substantially does not overshoot and the flow speed ratio is a value of 1.0. Then, 1.0 is multiplied to the base request Pias, and the base request Pias is optimized with the value not changed so that an optimized base request Pias' is obtained.

When the base request Pias is optimized based on the flow speed ratio, the request Pia is obtained by performing the first-order delay calculation to the optimized base request Pias' in the first-order delay calculation block B120 (a request torque calculator). Specifically, a calculation is executed based on the following first-order delay equation 2.

$$Pia = K \times a + (1K) \times b \quad (2)$$

Here, K is a first-order delay filter coefficient which is appropriately set. And, "a" is the previous request Piaf which is the previous value of the request Pia as the target output, and "b" is an input obtained by switching the optimized base request Pias' and the base request Pias according to conditions.

For example, when the driver steps on the accelerator pedal and causes the engine to accelerate, that is, when the accelerator request signal is changed from the weak side to the strong side, the request Pia to which the first-order delay calculation is performed can become larger than the base request Pias. Then, before transitioning to the first-order delay calculation block B120, the base request Pias is compared with the request Pia to which the first-order delay calculation is performed, and switches the input "b" of equation 2. That is, as shown in FIG. 2, when the request Pia to which the first-order delay calculation is performed is equal to or less than the base request Pias (Pia≤Pias), the first-order delay calculation is performed to the optimized base request Pias' in the first-order processing block B120. On the other hand, when the request Pia to which the first-order delay calculation is performed is larger than the base request Pias, the original base request Pias is input into the first-order delay calculation block B120, and the first-order delay calculation is performed to the original base request Pias.

As described above, since the base request Pias is optimized by the flow speed ratio to obtain the optimized base request Pias' and the request Pia is obtained by performing the first-order delay calculation to the optimized base request Pias', it is possible to correctly assume the target intake air flow rate realistically by the one first-order delay equation 2 without dividing the critical region and the non-critical region in the invention, even the target intake air flow rate is assumed by performing the separate calculation processings in the critical region and the non-critical region or obtained by performing the calibration in the related art.

Further, as described above, for example, when the driver steps on the accelerator pedal and causes the engine to accelerate, that is, when the accelerator request signal is varied from the weak side to the strong side, the request Pia to which the first-order delay calculation is performed can become larger than the base request Pias. Therefore, the base request Pias is compared with the request Pia to which the first-order delay calculation is performed even in the comparison block B122. When the request Pia to which the first-order delay calculation is performed is equal to or less than the base request Pias (Pia Pias), without changing, and the request Pia to which the first-order delay calculation is performed is finally output as the request Pia. On the other hand, when the request Pia to which the first-order delay calculation is performed is greater than the base request Pias, the request Pia is clipped to the base request Pias, and the base request Pias is finally output as the request Pia.

Figure 4:
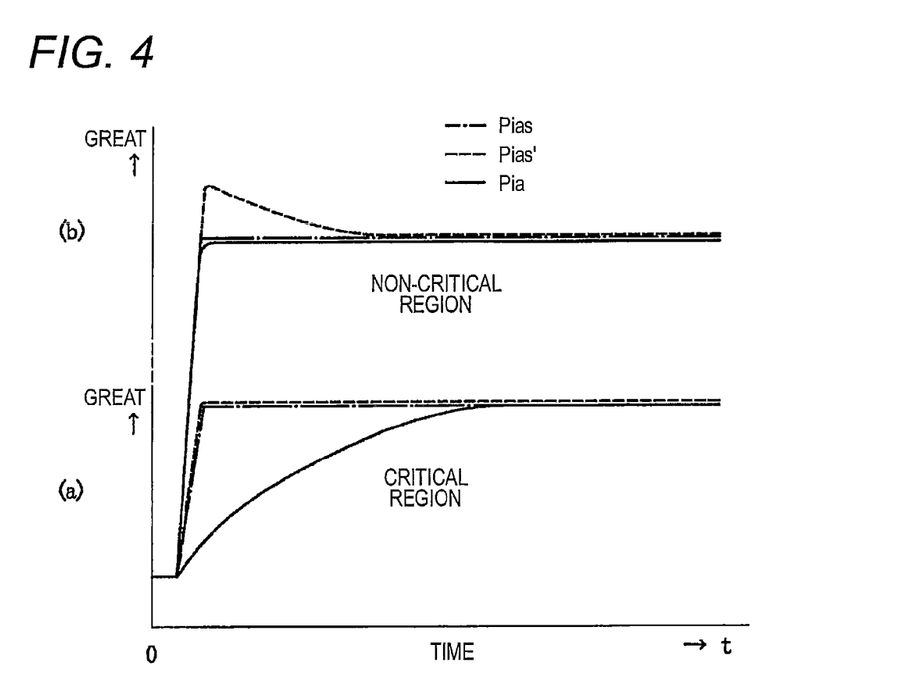
FIG. 4 is a diagram showing time variations of a base request Pias (a dashed line) and an optimized base request Pias' (a broken line), and a request Pia (a solid line) to which a first-order delay calculation is performed, with respect to a critical region and a non-critical region respectively.

Here, with reference to FIG. 4, for example, when the driver operates the accelerator pedal by a step-like manner so as to accelerate the engine from the idle driving state, time variations of the base request Pias (a dashed line) based on the accelerator request signal, the optimized base request Pias' (the broken line), and the request Pia (the solid line) to which the first-order delay calculation is performed and which is reflected to the target intake air flow rate Qt are separately illustrated by the case of the critical region (a) and the case of the non-critical region (b). Then, as shown in FIG. 4, in the critical region, similarly to the related art, the target intake air flow rate Qt is gradually increased on the basis of the actual intake air flow rate Qr, and is converged to the base request Pias. Further, in the non-critical region, the target intake air flow rate Qt is varied so as to approximately maintain the base request Pias on the basis of the actual intake air flow rate Qr, and is converged to the base request Pias.

In this way, according to the output control device of the invention, regardless of the accelerator operation state, not only at the critical region where the pressure ratio (the intake air pressure/the atmospheric pressure) is equal to or less than the predetermined value (for example, 0.5283) but also at the non-critical region where the pressure ratio exceeds the predetermined value, the base request Pias is favorably obtained by the one first-order delay equation. Therefore, the target intake air flow rate Qt can accurately be realistically assumed by the simple configuration and the driving parameters of the engine and further the output torque can be properly controlled.

Further, if the request Pia to which the first-order delay calculation is performed is greater than the base request Pias, since the request Pia is finally clipped in (restricted to) the base request Pias, even when the driver steps on the accelerator pedal and causes the engine to be accelerated, the request Pia can be reliably suppressed to equal to or less than the base request Pias, which is the convergence value, and it is possible to suppress an occurrence of excess output torque.

Further, to obtain the flow speed ratio based on the base request Pias and the previous request Piaf respectively in the current request flow speed calculation block B112 and the previous request flow speed calculation block B114, the atmospheric pressure corrections of the base request Pias and the previous request Piaf are performed in the atmospheric pressure correction block B116. Therefore, in the current request flow speed calculation block B112 and the previous request flow speed calculation block B114, the current request flow speed or the last request flow speed can be obtained based on the respective single request flow speed map without requiring plural maps. Thus, the target intake air flow rate Qt can be accurately assumed by a simpler configuration.

According to the output control device of the invention, by using the IMEP Pi corresponding respectively to the request torque and the base request torque as each index, the IMEP having a close correlation with the output torque of the internal combustion engine is used, and can easily and accurately assume the target intake air flow rate in keeping with actuality. Therefore, it is possible to properly control the driving parameter of the internal combustion engine and further the output torque.

[Second Embodiment]

Figure 5:
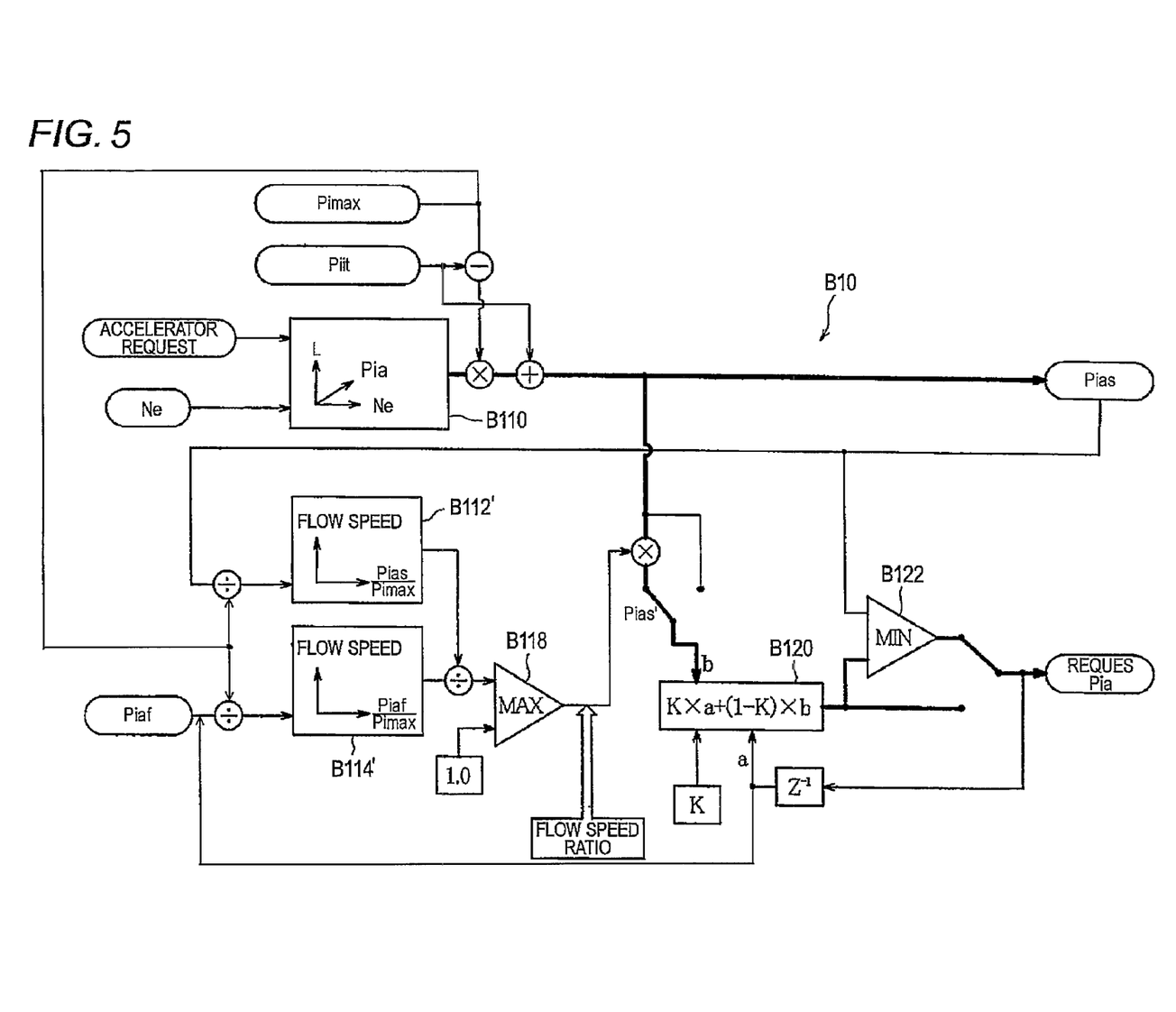
FIG. 5 is a control block diagram showing a calculation procedure of a request Pia of an output control device according to a second embodiment of the invention.

FIG. 5 is a control block diagram showing a calculation procedure of a request Pia in the accelerator request Pi calculation block B10 of an output control device of a vehicle according to a second embodiment of the invention. Hereinafter, the calculation procedure of the request Pia according to a second embodiment of the invention will be described in detail based on FIG. 5.

In the second embodiment, the ratio between the current request flow speed and the previous request flow speed (the previous request flow speed/the current request flow speed), that is, the flow speed ratio is easily calculated, and this is different from the first embodiment. Hereinafter, portions of the second embodiment which are different from those of the first embodiment will mainly be described.

In the second embodiment, similar to the case of the first embodiment, the base request Pias is obtained. The base request Pias is divided by the above-described Pimax (Pias/Pimax), and is provided to the current request flow speed calculation block B112'. Further, the flow speed of the intake air corresponding to the request Pias in the current request flow speed calculation block B112', that is, the current request flow speed is calculated. The relation between the current request flow speed and Pias/Pimax is preset as a request flow speed map which uses Pias/Pimax as a parameter.

Meanwhile, the previous request Piaf, which is the request Pia that is calculated in the previous calculation period and is stored in the ECU 10, is divided by the above-described Pimax similarly as the above (Piaf/Pimax), and is provided to the previous request flow speed calculation block B114'. Actually, as shown in FIG. 5, "a", which is input to the above-described first-order delay calculation block B120 as the previous request Piaf, is used. In addition, the flow speed of the intake air corresponding to the previous request Piaf in the previous request flow speed calculation block B114', that is, the previous request flow speed is calculated. The relation between the request flow speed and Piaf/Pimax is also preset as a request flow speed map which uses Piaf/Pimax as parameter.

If the current request flow speed is obtained by using Pias/Pimax as a parameter and the previous request flow speed is obtained by using Piaf/Pimax as a parameter, since the engine rotation speed Ne is already considered in the request load ratio calculation block B110 with respect to the base request Pias or the previous request Piaf, the current request flow speed and the previous request flow speed can be simply obtained in the current request flow speed calculation block B112' or the previous request flow speed calculation block B114' without considering the engine rotation speed Ne again.

Here, since the value of Piaf/Pimax has a high relationship with respect to the above-described pressure ratio (=the intake air pressure/the atmospheric pressure), the flow speed can be calculated based on the value of Piaf/Pimax. In addition, in this case, since the atmospheric pressure is cancelled out when the value of Piaf/Pimax is obtained, the atmospheric pressure correction (the atmospheric pressure correction block B116 of FIG. 2) is not necessary.

When the current request flow speed and the previous request flow speed are calculated, similar to the case of the first embodiment, the ratio between the current request flow speed and the previous request flow speed (the previous request flow speed/the current request flow speed), that is, the flow speed ratio is easily obtained by dividing the previous request flow speed by the current request flow speed (the flow speed ratio calculator).

In addition, similar to the case of the first embodiment, the base request Pias is optimized through the comparison block B118 based on the obtained flow speed ratio, the first-order delay is performed based on the first-order delay equation (2) in the first-order delay calculation block B120, and the request Pia is obtained (the request torque calculator).

In this way, similar to the case of the first embodiment, regardless of the accelerator operation state, not only at the so-called critical region where the pressure ratio (the intake air pressure/the atmospheric pressure) is equal to or less than the predetermined value (for example, 0.5283) but also at the so-called non-critical region where the pressure ratio exceeds the predetermined value, the base request Pias is favorably obtained by one first-order delay equation. Therefore, the target intake air flow rate Qt can be accurately assumed on the basis of reality by the simple configuration, and the driving parameter of the engine and further the output torque can be appropriately controlled.

Particularly, here, since the flow speed ratio is obtained based on the current request flow speed which uses Pias/Pimax as a parameter and the previous request flow speed which uses Piaf/Pimax as a parameter, the driving parameter of the engine and further the output torque can be appropriately controlled by the simple configuration.

Hereinabove, the output control device of the invention is explained, but the invention is not limited to the above embodiments.

For example, in the above embodiments, based on the IMEP Pi, the request Pia and the previous request Piaf as the index of the request torque, the base request Pias and the optimized base request Pias' as the index of the base request torque, and Pimax as the index of the maximum torque are respectively obtained, and these are used. However, similarly to the case of the IMEP Pi, since the actual intake air flow rate of the engine, a volumetric efficiency and a filling efficiency Ec have a high correlation with each other, the volumetric efficiency or the filling efficiency Ec may be used as indexes of the request torque, the base request torque, and the maximum torque instead of the IMEP Pi, and, in this case, similar effects as the above can be obtained. Further, in the above first embodiments, the atmospheric pressure correction is preformed with respect to the base request Pias and the request Piaf. However, the invention is not limited to atmospheric pressure correction, and the base request Pias or the previous request Piaf may be corrected based on environmental parameters which are related to the output torque of the engine, such as intake air temperature or coolant temperature of the engine.

What is claimed is:

1. An output control device of a vehicle in which an internal combustion engine is mounted, the output control device comprising:
   an accelerator manipulation degree detector that detects an operation degree of an accelerator installed in the vehicle;
   a base request torque calculator that calculates a base request torque based on the operation degree of the accelerator;
   a request torque calculator that calculates a request torque based on the base request torque;
   a flow speed ratio calculator that obtains a flow speed ratio which is a ratio between a flow speed of an intake air of the internal combustion engine realizing a current base request torque which is currently calculated by the base request torque calculator and a flow speed of the intake air of the internal combustion engine realizing a previous request torque which is previously calculated by the request torque calculator;
   a base request torque corrector that corrects the base request torque based on the flow speed ratio; and
   a controller that controls a driving parameter of the internal combustion engine according to the current request torque which is currently calculated by the request torque calculator based on the current base request torque corrected by the base request torque corrector.

2. The output control device according to claim 1, further comprising
   a maximum torque setting unit that sets a maximum torque which is the maximum value of the output torque of the internal combustion engine which is realizable as the request torque,
   wherein the flow speed ratio calculator calculates the flow speed of the intake air of the internal combustion engine realizing the current base request torque based on a ratio between the current base request torque and the maximum torque which is set by the maximum torque setting unit, and the flow speed ratio calculator calculates the flow speed of the intake air of the internal combustion engine realizing the previous request torque based on a ratio between the previous request torque and the maximum torque which is set by the maximum torque setting unit.

3. The output control device according to claim 2, wherein
the request torque includes an indicated mean effective pressure corresponding to the request torque as an index of the request torque, the base request torque includes an indicated mean effective pressure corresponding to the base request torque as an index of the base request torque and the maximum torque includes an indicated mean effective pressure corresponding to the maximum torque as an index of the maximum torque.

4. The output control device according to claim 2, wherein
the request torque includes a filling efficiency corresponding to the request torque as an index of the request torque, the base request torque includes a filling efficiency corresponding to the base request torque as an index of the base request torque, and the maximum torque includes a filling efficiency corresponding to the maximum torque as an index of the maximum torque.

5. The output control device according to claim 2, wherein
the request torque includes a volumetric efficiency corresponding to the request torque as an index of the request torque, the base request torque includes a volumetric efficiency corresponding to the base request torque as an index of the base request torque, and the maximum torque includes a volumetric efficiency corresponding to the maximum torque as an index of the maximum torque.

6. The output control device according to claim 1, wherein
the request torque calculator sets the request torque to be restricted to the base request torque when the request torque calculated by the request torque calculator is larger than the base request torque.

\* \* \* \* \*